United States Patent
Cato et al.

(10) Patent No.: US 11,766,905 B2
(45) Date of Patent: Sep. 26, 2023

(54) UNATTENDED TRAILER HITCH LOCK

(71) Applicant: Altor Locks, LLC, Sterling, VA (US)

(72) Inventors: Dylan Cato, Sterling, VA (US); Austin Lazo, Cenreville, VA (US)

( * ) Notice: Subject to any disclaimer, the term of this patent is extended or adjusted under 35 U.S.C. 154(b) by 0 days.

(21) Appl. No.: 17/625,133

(22) PCT Filed: Jun. 29, 2021

(86) PCT No.: PCT/US2021/039605
§ 371 (c)(1),
(2) Date: Jan. 6, 2022

(87) PCT Pub. No.: WO2022/026103
PCT Pub. Date: Feb. 3, 2022

(65) Prior Publication Data
US 2023/0143140 A1    May 11, 2023

Related U.S. Application Data

(60) Provisional application No. 63/057,085, filed on Jul. 27, 2020.

(51) Int. Cl.
*B60D 1/60* (2006.01)
*B60D 1/06* (2006.01)

(52) U.S. Cl.
CPC ............... *B60D 1/60* (2013.01); *B60D 1/06* (2013.01)

(58) Field of Classification Search
CPC .................................... B60D 1/06; B60D 1/60
See application file for complete search history.

(56) References Cited

U.S. PATENT DOCUMENTS

| | | | |
|---|---|---|---|
| 3,233,913 A | 2/1966 | Brown | |
| 4,807,899 A | 2/1989 | Belcher | |
| 5,222,755 A | 6/1993 | O'Neal | |
| 5,743,549 A | 4/1998 | Jackson | |
| 5,752,398 A * | 5/1998 | Villalon, Jr. | B60D 1/60 280/507 |
| 6,722,686 B2 * | 4/2004 | Koy | B60D 1/06 280/507 |
| 7,040,646 B2 | 5/2006 | Pare | |
| 7,204,508 B1 | 4/2007 | Hsai | |
| 7,469,919 B2 * | 12/2008 | Kalous | B60D 1/60 280/507 |
| 7,909,351 B2 | 3/2011 | Hui | |
| 8,020,885 B2 | 9/2011 | Cuellar et al. | |
| 8,151,605 B1 | 4/2012 | Gustafson | |
| 9,649,900 B2 * | 5/2017 | Tsai | B60D 1/06 |
| 9,701,169 B2 | 7/2017 | Volin | |
| 10,549,589 B1 | 2/2020 | Burress | |
| 2004/0211230 A1 | 10/2004 | Recknagel et al. | |
| 2006/0017260 A1 | 1/2006 | Andersen | |

(Continued)

OTHER PUBLICATIONS

Amplock U-LPCVR 5th Wheel Lock for King Pin.

(Continued)

*Primary Examiner* — Tony H Winner (57) ABSTRACT

A trailer hitch lock provides a finned, external shell around a centrally-disposed lock assembly. The material of the shell, its distribution of fins, and the fin dimensions all cooperate to defeat a destructive attack on the lock by a portable angle grinder.

23 Claims, 7 Drawing Sheets

(56) References Cited

U.S. PATENT DOCUMENTS

| | | |
|---|---|---|
| 2006/0163842 A1* | 7/2006 | Jacques .................... B60D 1/60 |
| | | 280/507 |
| 2006/0208458 A1 | 9/2006 | Kalous et al. |
| 2006/0284398 A1 | 12/2006 | Wu |
| 2007/0069501 A1* | 3/2007 | Hsai ........................ B60D 1/60 |
| | | 280/507 |
| 2008/0036179 A1 | 2/2008 | Andersen |
| 2010/0244407 A1 | 9/2010 | Hsai |
| 2011/0101648 A1 | 5/2011 | Hsai |
| 2015/0258866 A1 | 9/2015 | Frantz |
| 2017/0100973 A1 | 4/2017 | Tsai |
| 2020/0023698 A1 | 1/2020 | Tsai |

OTHER PUBLICATIONS

Proven Industries: Model PL-5, fifth wheel lock.
Steel trailer king pin lock.
War-Lock: Heavy Duty Conical Trailer King Pin Lock.

* cited by examiner

UNATTENDED TRAILER HITCH LOCK

CROSS REFERENCE TO RELATED APPLICATION

This application claims priority to provisional application Ser. No. 63/057,085 filed Jul. 27, 2020, and is the national phase of application PCT/US21/39605 filed Jul. 29, 2021, the disclosures of which are hereby incorporated by reference.

FIELD OF THE INVENTION

The present invention relates to a trailer hitch lock that prevents the theft of boats, lawn care equipment, and snowmobiles that are carried on a trailer but that may be parked and unattended for extended periods of time.

BACKGROUND OF THE INVENTION

A multitude of vehicles and equipment are carried on a trailer that connects to a towing vehicle with a ball hitch system. In such a system, the towing vehicle has a ball hitch mounted at the rear of the vehicle. The trailer has a forward trailer tongue with a semi-spherical receiver that fits over the rounded top of the ball on the towing vehicle. To aid in guiding the ball into the receiver and to reinforce the receiver, the bottom of the receiver often has a coupling, such as a flared flange. Once in position over the ball, the receiver is secured by an armature that is extended around the lower part of the ball by rotating an external handle down and toward the hitch. Such a system has been used for decades and is prevalent in a wide variety of towed vehicles, equipment, cargo, and mobile homes.

A similar system with a square-shaped hollow receiver tube is shown in U.S. Pat. No. 4,807,899 and US Publication 2015/0258866.

Trailers and their cargo are often parked in a place where it is convenient for the owner to pull in and disconnect the trailer. A dolly wheel and crank are often used to adjust the height of the connection frame to remain level. If left unprotected, however, there is little that prevents a thief from connecting to the unprotected receiver and pulling off. A trailer hitch lock secures the receiver from connecting to an unauthorized ball hitch.

Conventional trailer hitch lock systems engage the semi-spherical opening of the receiver with an obstruction that blocks access by an unauthorized vehicle. See U.S. Pat. Nos. 3,233,913; 5,222,755; and 5,743,549.

One type of locking system has an engagement lip that engages the receiver's flared flange and includes an insert into the receiver portion of the trailer hitch. See, U.S. Pat. Nos. 7,040,646; 7,204,508; 7,909,351; 8,020,885; and 9,701,169 (locking ball insert) and US published application nos. 2006/0163842 (flared flange lock), 2006/0208458, and 2006/0284398 (flange lock with "2" armature).

Despite the advances in lock designs that are found in the prior art, trailers continue to be stolen by thieves wielding battery-powered angle grinders. These thieves attack the very material of the lock and can cut through the vulnerable points in minutes. When the trailer is unattended, theft by grinder attack is a very real possibility.

It would be advantageous to provide a trailer lock exhibiting an enhanced resistance to angle grinder attacks.

Conventional trailer locks also typically have an exposed locking mechanism that makes the system vulnerable to moisture and rusting of crucial parts. There are few things more frustrating to a boat owner than going to great lengths to secure the trailer against theft only to have the lock become rusted shut so as to prevent access by its owner.

It would be desirable to have a trailer lock that was also protected against moisture infiltration and rusting or degradation of crucial mechanisms needed to remove the trailer lock.

SUMMARY OF THE INVENTION

It is an object of the present invention to provide a trailer hitch lock that would protect the locked hitch from theft and destructive attack by an angle grinder.

It is also an object of the invention to have a trailer hitch lock that was protected from internal rusting due to moisture.

In accordance with the above and other objectives of the invention that will become apparent from the description herein, a trailer hitch lock according to the invention comprises: (a) a hardened core that includes a locking mechanism operably movable vertically from a first unlocked position into a second locked position, and (b) a grinder resistant shell surrounding said core that is shaped to engage a flared lip of a trailer hitch receiver and is characterized by a plurality of radially extending fins that are made from a soft material that clogs coarse aluminum oxide grit of a cutting disc. Optional additional features include one or more moisture-resistant seals around key movable parts to provide resistance to moisture infiltration and a freely rotating ring around the locking mechanism that foils drill-based attacks on the locking mechanism.

The trailer hitch of the invention provides an effective locking system for an unattended trailer that resists destructive attack with an angle grinder, whether battery-powered or AC-powered. Such additional security is enhanced with an anti-drill ring that hinders a direct, drill-based attack on the locking assembly and enhanced moisture resistance with seals at key junctures.

DETAILED DESCRIPTION

A first embodiment of a trailer hitch lock according to the invention is conveniently described with reference to the attached figures.

Figure 1:
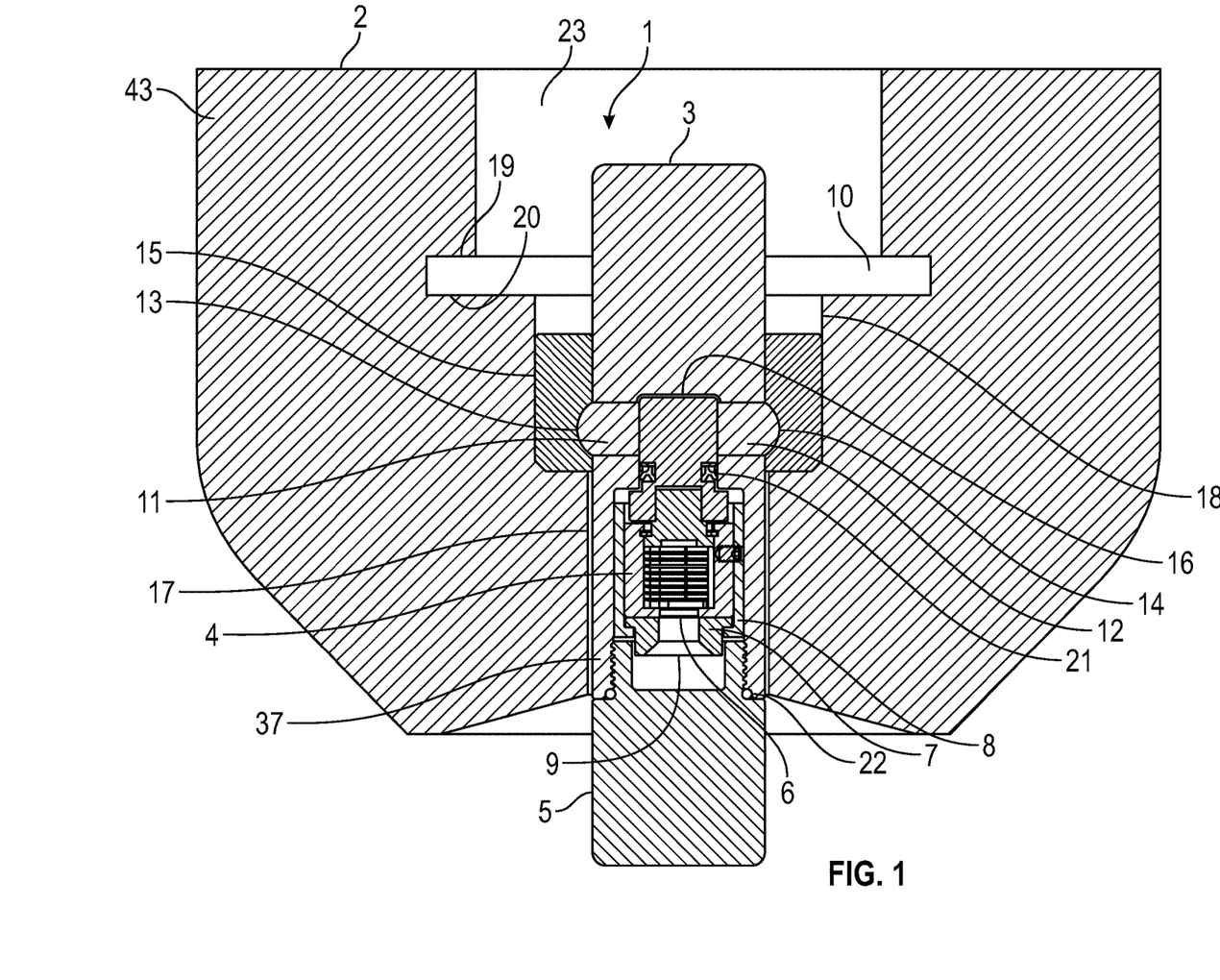
FIG. 1 is a cross sectional view of a first embodiment of the invention.

As shown in FIG. 1, the grinder-resistant trailer hitch lock according to the invention includes a lock assembly 1 that fits within a vertically-oriented, central chamber within a grinder-resistant shell 2. Lock assembly 1 includes: (a) lock body 3 that houses lock mechanism 4 and (b) threaded end cap 5 that seals keyhole 6 from dirt and moisture.

The present hitch lock is installed onto a trailer's hitch receiver 101 by slipping slot 10 of shell 2 onto the coupling member of a hitch receiver via channel 101 so that lock assembly 1 becomes positioned below the recess that would receive the semispherical ball of the hitch connection and is thereby positioned to extend vertically up and into the hollow receiver portion. A key is inserted into keyhole 6 to push lock assembly 1 upwardly and into that recess. The coupling member can take the form of a radial flange, cast sleeve coupler, sleeve lock, or ring but is conveniently described with reference to a conventional hitch flange.

The Locking Assembly

Lock mechanism 4 is disposed within shell 2. Shell 2 has an upper chamber 23 with a trailer slot 10 that receives a trailer hitch receiver in channel 101 between upper shoulder 19 and lower shoulder 20. Middle chamber 18 is where the hitch receiver is engaged by lock mechanism 4. Lower chamber 17 is where lock mechanism 4 retracts when unlocked and withdrawn from middle chamber 18. Collectively, upper chamber 23, middle chamber 18, and lower chamber 17 form lock channel 24.

The lock operates when lock mechanism 4 is pushed upwardly into middle chamber 18. As the key turns locking cam 16, first and second arms 11, 12 are driven radially outwardly by contact with locking cam 16 as the key turns lock mechanism 4 and cam 16. When in the locked position (FIG. 1), the cam blocks radial retraction of first and second arms 11, 12. When the key is turned to the unlocked position, cam 16 is turned so as to allow locking arms 11, 12 to radially retract and lock mechanism 4 may then be lowered into lower chamber 17. Once first and second locking arms 11, 12 are retracted, the whole lock body 3 can move down into lower chamber 17. These steps secure the lock over the hitch coupling and obstruct access to the hitch recess until the lock is removed.

Figure 2:
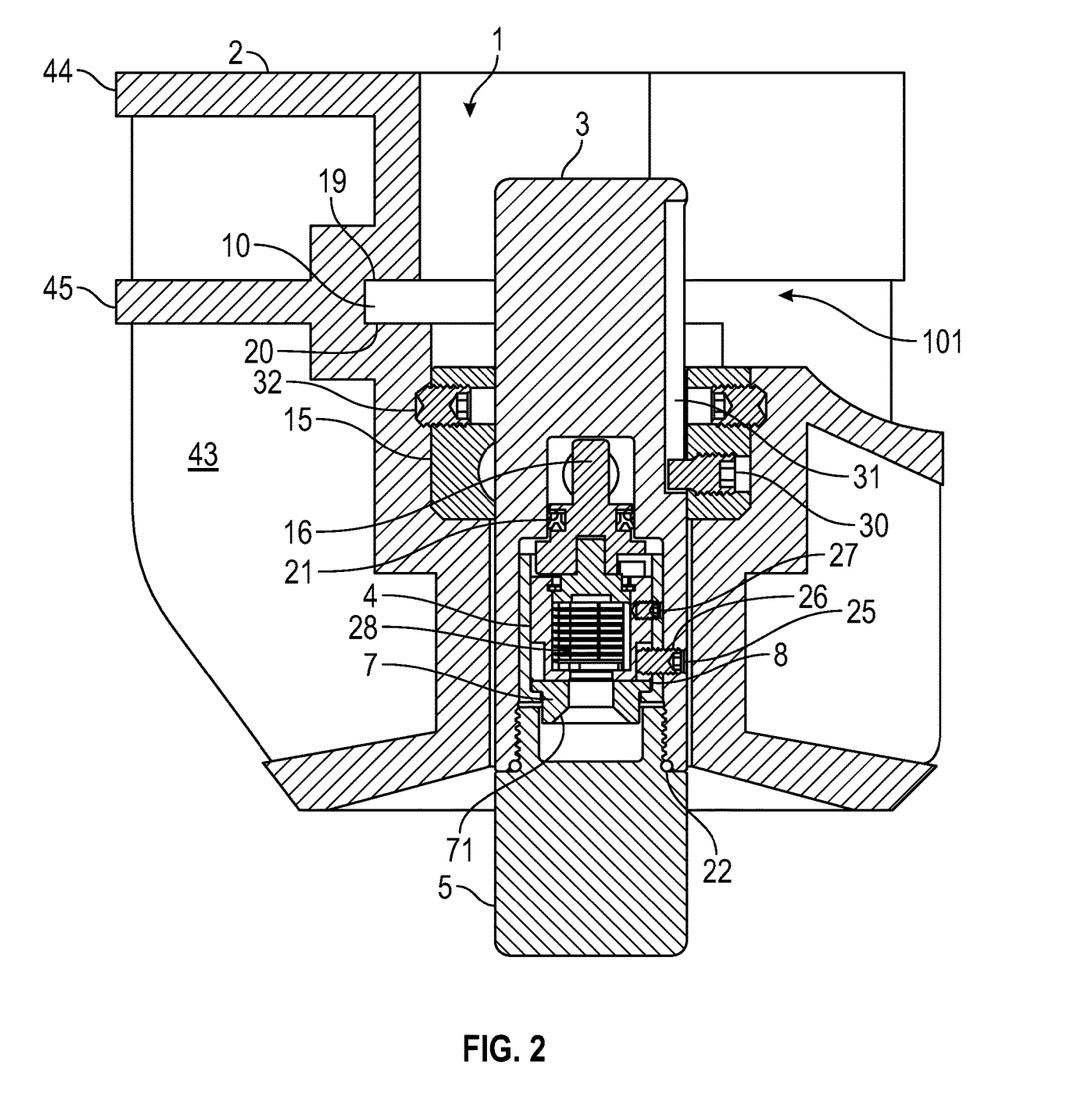
FIG. 2 is a side sectional view of a first embodiment according to the invention.
Figure 3:
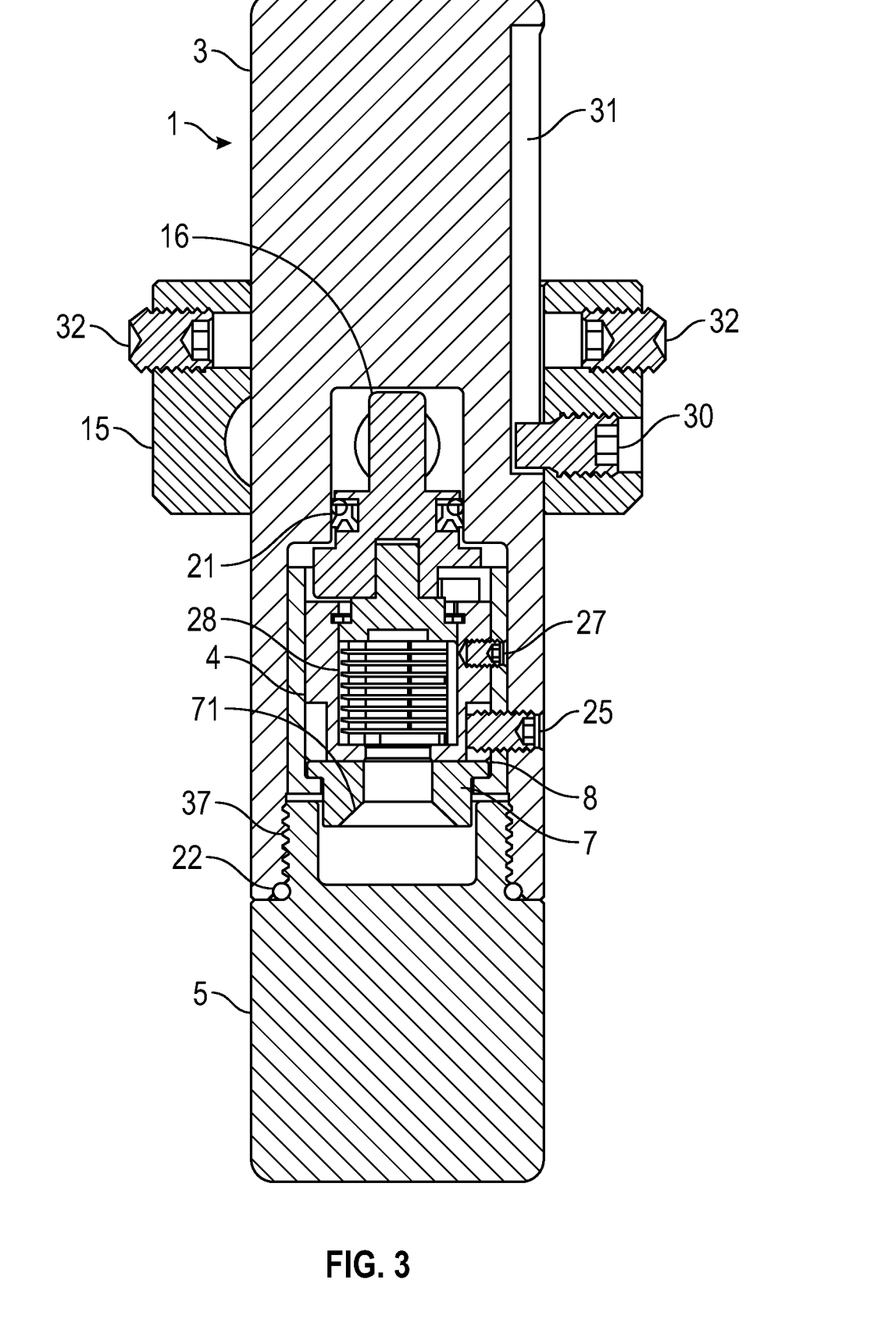
FIG. 3 is a sectional view of a lock assembly according to the invention.

As shown in FIGS. 1-3, locking ring 15 is secured in position in middle chamber 18 with opposing set screws 30 that can only be accessed when the lock is in the unlocked position and lock assembly 1 is removed. The lock body slider set screws 30 can be advanced to extend into vertical groove 31 formed in shell 2 to limit the travel of lock body 3. Retaining ring set screws 32 secure locking ring 15 within middle chamber 18 of shell 2. Set screws 32 are accessible only when lock body 3 is in its lowest position thus makes the manufacturing process easier because it allows the locking ring 15 to be securely fastened into shell 2 without requiring any post-machining of shell 2. Additionally, having the set screws accessible only from middle chamber 18 does not expose externally-accessible fasteners that could represent a potential security weak point.

Lock mechanism 4 is secured within lock body 3 with lock housing set screw 25 that extends radially inward from lock body 3 into a threaded opening 26 in lock mechanism 4. Lock mechanism set screw 27 secures tumblers 28 within lock mechanism 4.

Sealing rings are used at junctions to help prevent moisture from intruding into lock assembly. For example, FIGS. 1-3 show an upper seal 21 in the form of a U-cup seal around the base of locking cam 16 and a lower O-ring 22 at the junction between the lock body and its cap.

Figure 4:
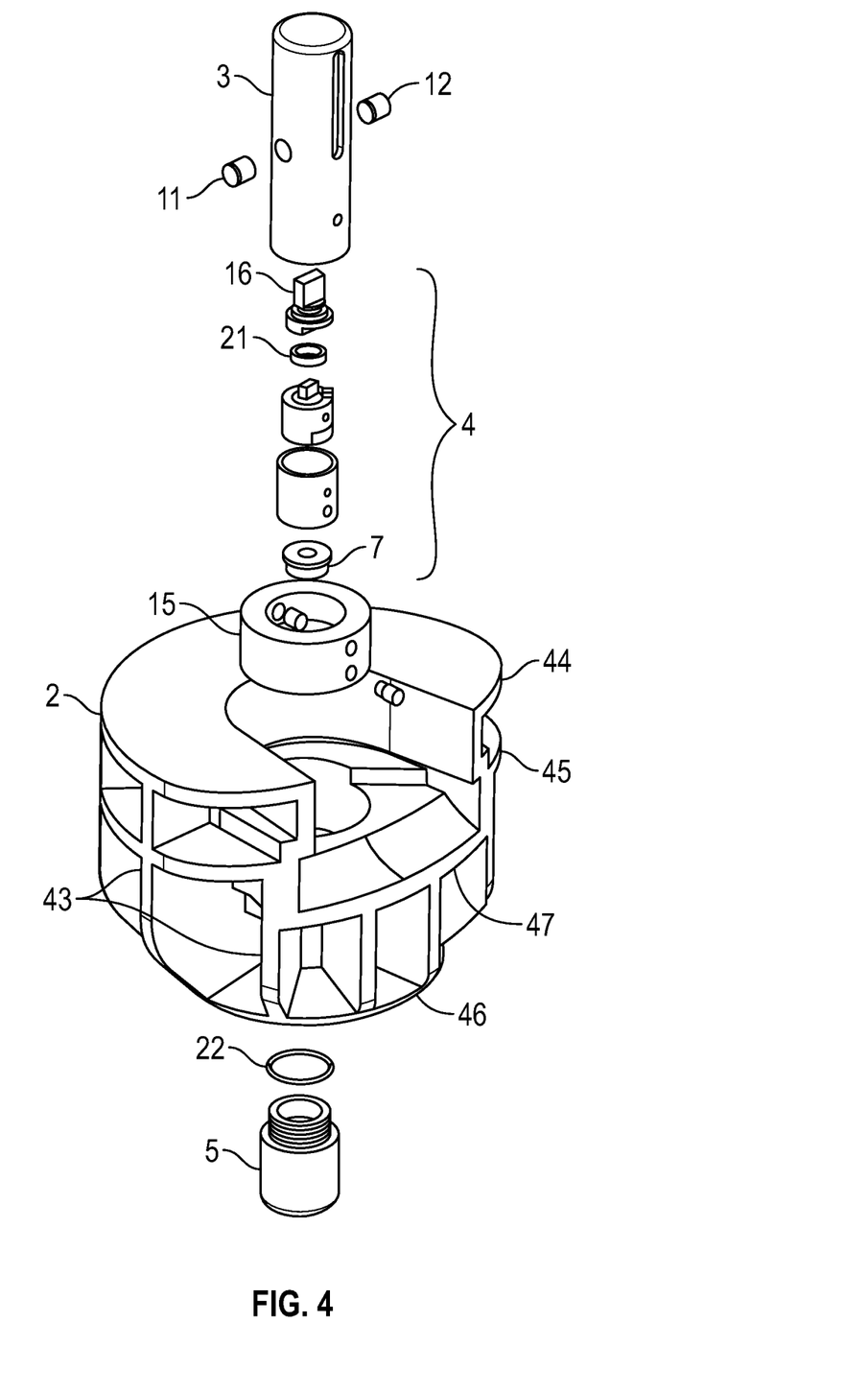
FIG. 4 is an exploded parts view of a hitch lock according to a first embodiment of the invention.

The bottom lock opening of the lock assembly is protected from a drill attach with anti-drilling ring 7. As shown in FIG. 4, freely rotating anti-drill ring 7 is held in position against shoulders 8 of lock mechanism 4. Anti-drill ring 7 has a tapered central opening 71 of a depth sufficient to allow a key to pass through the central opening 9 and engage lock mechanism 4. The tapering angle 72 of the inner walls of opening 9 are, however, smaller than the typical angle of a drill bit. Most drills are ground to an angle of about 118° so any opening angle that is substantially less, e.g., an angle 72 within the range of 75° to 100°, will cause the drill bit to engage the tapering sidewalls and spin freely without cutting effect. A drill bit 100 of sufficiently small diameter to pass through opening 9 may grind away internal parts of the lock but cannot extend to the peripheral tumblers so as to drill out the lock as a whole and disengage the internal mechanism that locks the assembly into an obstructing position within the hitch receiver.

Threaded end cap 5 is then screwed into the threaded bore 37 at the bottom of lock body 3. This protects lock assembly 4 from fouling by water, dirt, grit, and the like.

The Outer Shell

Surrounding locking assembly 1 is a grinder-resistant shell 2. Shell 2 interferes with, and preferably prevents, destructive attack against the lock assembly 1 by an angle grinder disc. This shell 2 can be made of a relatively softer metal that clogs the grit of a grinding wheel or it can be made from a relatively hard metal that is not readily cut, ground, or scored by typical grinding wheel grit. Shell 2 can be cast as a single, unitary piece (FIG. 1) or formed in separate parts that are joined together (FIG. 5).

Permanent mold casting is the preferred process to make the grinder resistant shell 2 of the present invention.

Figure 5:
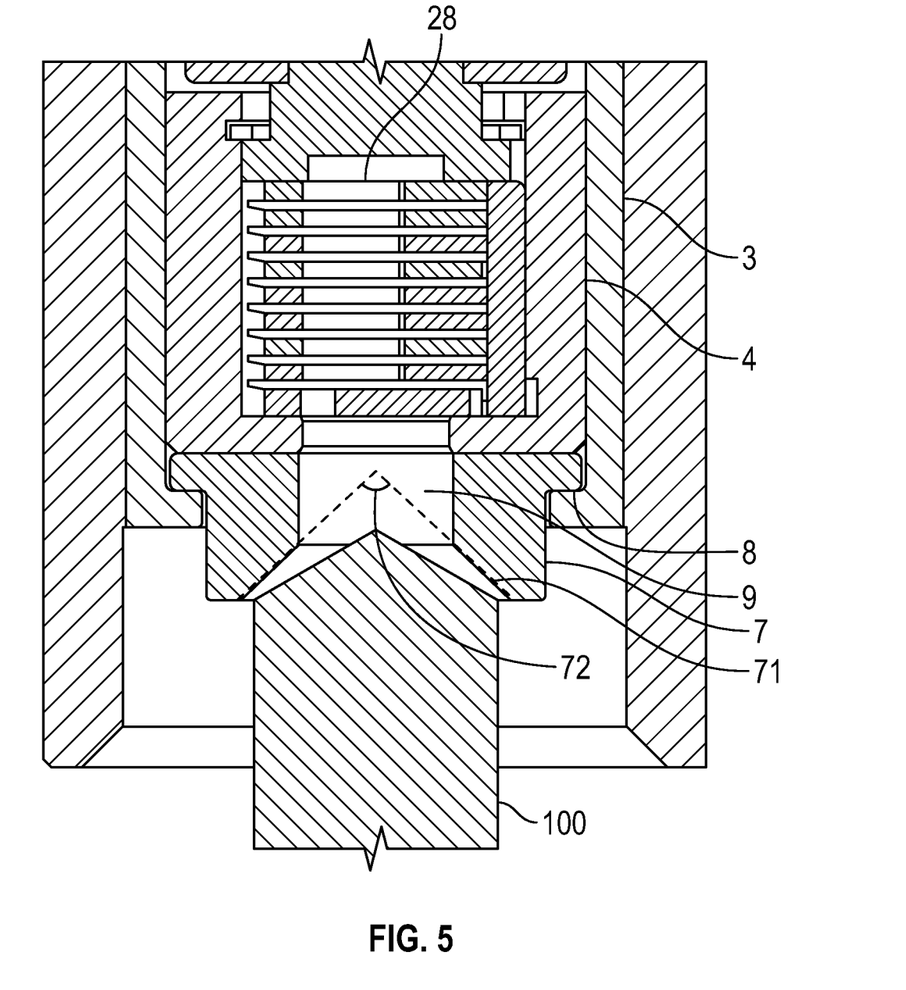
FIG. 5 presents a detailed sectional view of an anti-drill feature of the invention.

A second embodiment of the invention is shown in FIG. 5 which shows the use of a three-piece shell. This design uses a hardened steel core coupler 33 sandwiched between a top shell piece 34 and a bottom shell piece 35 that are joined together around core coupler 33. Top shell piece 34 and bottom shell piece 35 may be solid or exhibit internal fins (not shown) in the same manner as discussed above.

The top and bottom shell pieces 34, 35 may be made of a material that is relatively softer than the grit of an angle grinder wheel to clog the grit to reduce the grinder's cutting efficiency and thereby drain the tool's battery with little cutting to show for the efforts. Conversely, the top and bottom shell pieces 34, 35 may also be made of a material that is hard and relatively hard to scratch with a typical carborundum cutting disk.

A wide variety of metal joining methods can be used to join the top and bottom shell pieces 34, 35, such as, thermoset adhesives such as epoxy, mechanical fasteners such as rivets, and fusion methods such as welding. Welding is preferred.

Once positioned and secured to each other, the three-piece shell is preferably greater than 35 mm, preferably 37-55 mm, and even more preferably 40-50 mm in thickness from any direction that is accessible once the lock is installed on a trailer hitch. A typical angle grinder disc penetrates about 35 mm so a shell thickness that is greater than this depth will act as a visual and functional deterrent in the decision of whether to attempt to attack this lock.

Figure 6:
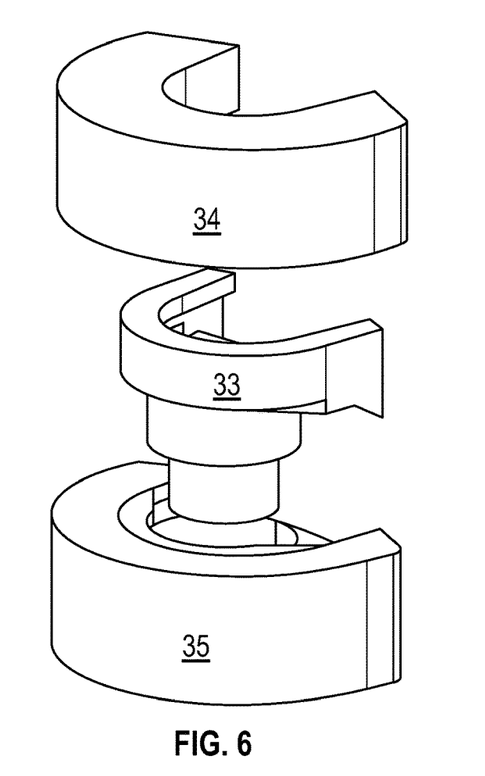
FIG. 6 is an exploded view of a three-piece shell according to an embodiment of the invention.
Figure 7:
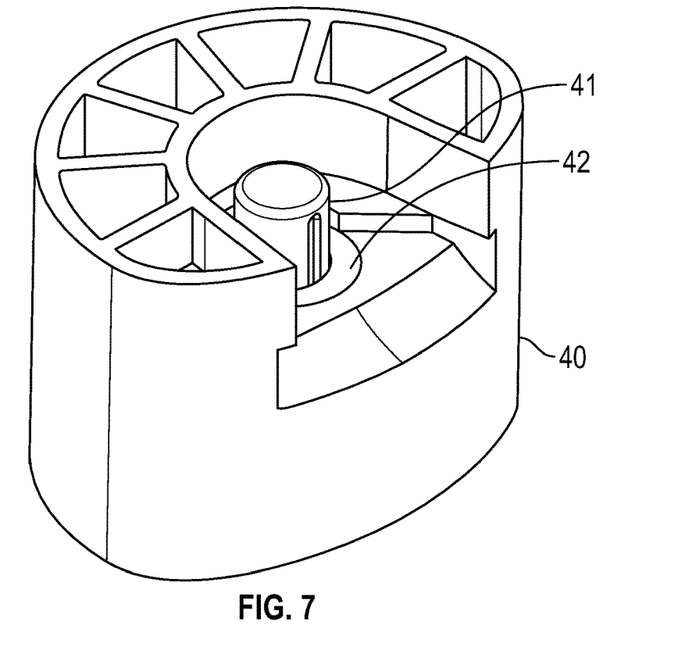
FIG. 7 is an external view of a unitary, cast shell according to an embodiment of the invention.
Figure 8:
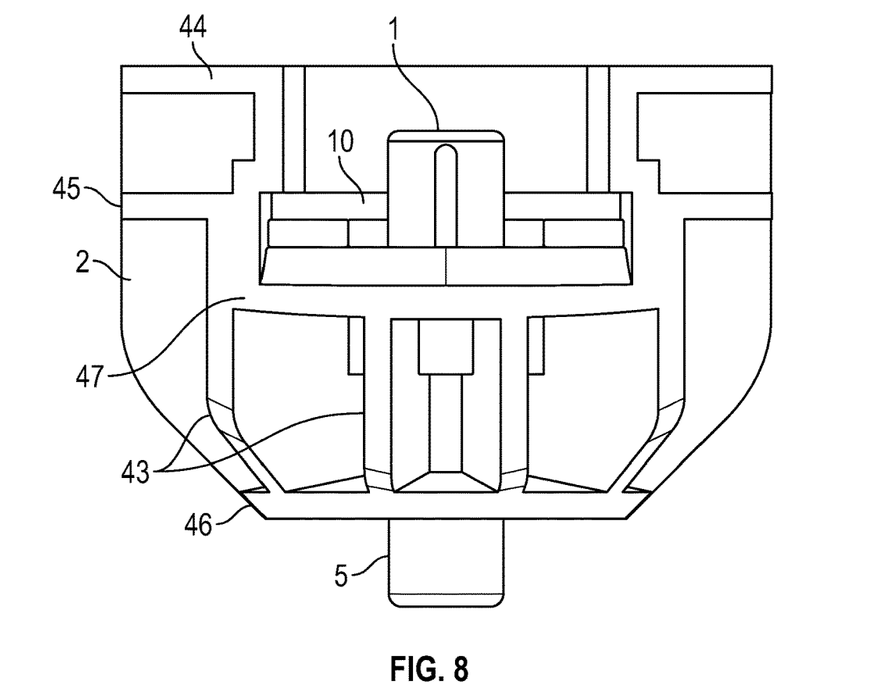
FIG. 8 is a front external view of a finned embodiment of the present invention.
Figure 9:
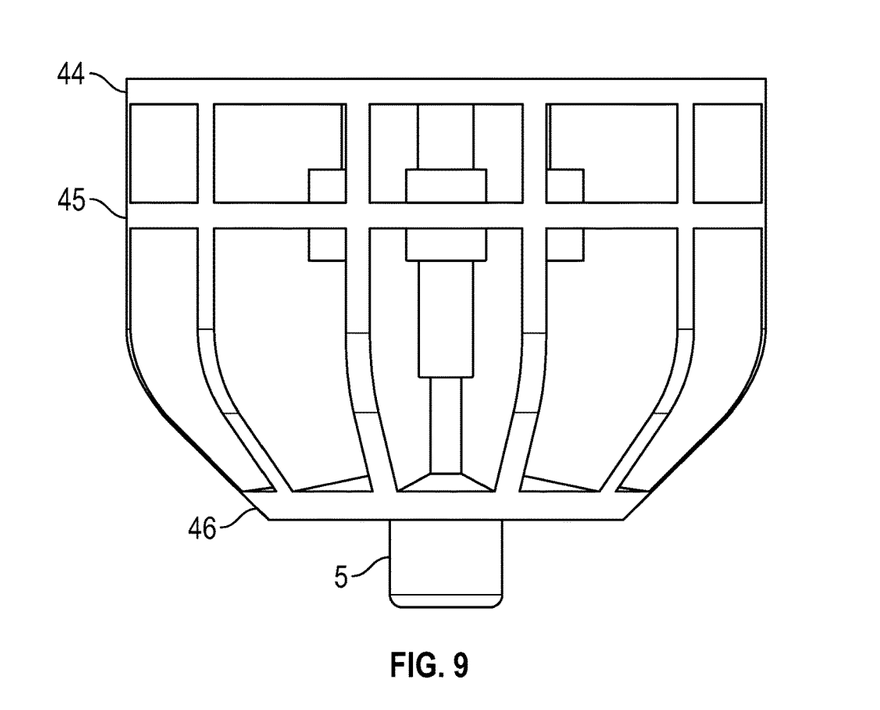
FIG. 9 is a rear view of a finned embodiment of the invention.

A third embodiment of a lock according to the invention is shown in FIG. 6. In this embodiment, the cast shell 40 surrounds the locking core 41 and middle section 42 of the coupler. Preferably, the cast shell 40 is made from steel or aluminum. This embodiment allows cast shells of ever greater diameter to defeat even the largest of portable grinder disks while also eliminating the need for lock assembly. This shell can be hollow or internally finned.

Shell 2 protects lock assembly 1 from destructive attack with a series of 7-15 vertical ribs 43. In the exposed side of the lock (as shown in FIGS. 2, 3, 7, and 8), ribs 43 extend between upper horizontal support 44, central horizontal support 45 and lower horizontal support 46. On the side that faces the trailer (FIG. 3), some of ribs 43 only extend between a lower central support 47 and lower horizontal support 46 so as to leave slot 10 unobstructed and able to receive the hitch coupling in channel 101. Ribs 43 may, or may not, extend to a surface on the bottom or top of the rib.

Outer shell 2 is preferably made from a material that is relatively softer than the metal of the lock assembly 1 and is preferably chosen to clog the aluminum oxide grinding wheels most commonly used. Suitable materials include aluminum, aluminum alloys, aluminum-containing polymeric composites, and brass. Aluminum and its alloys are preferred. It is also useful, however, to make outer shell 2 from a material or metal that is relatively hard to cut or scratch with the grit on a conventional grinder.

Die casting is a cheaper and faster process for casting aluminum parts. Die cast parts are also too porous to weld.

The preferred alloys that are suitable shell materials have a copper content less than 0.5%. It is essential that the copper content of the alloys is low in order for it to be welded in a commercially viable process. The main purpose of copper in aluminum alloys is to increase the alloys reactivity to heat treatment, however, increased copper also decreases weldability and reduces corrosion resistance. Table 1 below identifies some of the suitable aluminum alloys for use in the shell of the invention. The values indicate maximum limits unless shown as a range or a minimum.

TABLE 1

Chemical Composition Limits for Aluminum Alloys (Wt %)

| Alloy | Si | Fe | Cu | Mn | Mg | Cr | Zn | Ti | OTHERS EACH | OTHERS TOTAL | Al MIN. |
|---|---|---|---|---|---|---|---|---|---|---|---|
| 1070 | 0.20 | 0.25 | 0.04 | 0.03 | 0.03 | — | 0.04 | 0.03 | 0.03 | — | 99.70 |
| 1100 | 0.95 Si + Fe | | 0.05-0.20 | 0.05 | — | — | 0.10 | — | 0.05 | 0.15 | 99.00 |
| 3003 | 0.6 | 0.7 | 0.05-0.20 | 1.0-1.5 | — | — | 0.10 | — | 0.05 | 0.15 | Rem. |
| 3004 | 0.30 | 0.7 | 0.25 | 1.0-1.5 | 0.8-1.3 | — | 0.25 | — | 0.05 | 0.15 | Rem. |
| 3005 | 0.6 | 0.7 | 0.30 | 1.0-1.5 | 0.20-0.6 | 0.10 | 0.25 | 0.10 | 0.05 | 0.15 | Rem. |
| 3104 | 0.6 | 0.8 | 0.05-0.25 | 0.8-1.4 | 0.8-1.3 | — | 0.25 | 0.10 | 0.05 | 0.15 | Rem. |
| 4004 | 9.0-10.5 | 0.8 | 0.25 | 0.10 | 1.0-2.0 | — | 0.20 | — | 0.05 | 0.15 | Rem. |
| 4104 | 9.0-10.5 | 0.8 | 0.25 | 0.10 | 1.0-2.0 | — | 0.20 | — | 0.05 | 0.15 | Rem. |
| 4043 | 4.5-6.0 | 0.8 | 0.30 | 0.05 | 0.05 | — | 0.10 | 0.20 | 0.05 | 0.15 | Rem. |
| 4045 | 9.0-11.0 | 0.8 | 0.30 | 0.05 | 0.05 | — | 0.10 | 0.20 | 0.05 | 0.15 | Rem. |
| 5005 | 0.30 | 0.7 | 0.20 | 0.20 | 0.50-1.1 | 0.10 | 0.25 | — | 0.05 | 0.15 | Rem. |
| 5050 | 0.40 | 0.7 | 0.20 | 0.10 | 1.1-1.8 | 0.10 | 0.25 | — | 0.05 | 0.15 | Rem. |
| 5052 | 0.25 | 0.40 | 0.10 | 0.10 | 2.2-2.8 | 0.15-0.35 | 0.10 | — | 0.05 | 0.15 | Rem. |
| 5252 | 0.08 | 0.10 | 0.10 | 0.10 | 2.2-2.8 | — | 0.05 | — | 0.03 | 0.10 | Rem. |
| 5056 | 0.30 | 0.40 | 0.10 | 0.05-0.20 | 4.5-5.6 | 0.05-0.20 | 0.10 | — | 0.05 | 0.15 | Rem. |
| 5657 | 0.08 | 0.10 | 0.10 | 0.03 | 0.6-1.0 | — | 0.05 | — | 0.02 | 0.05 | Rem. |
| 5182 | 0.20 | 0.35 | 0.15 | 0.20-0.50 | 4.0-5.0 | 0.10 | 0.25 | 0.10 | 0.05 | 0.15 | Rem. |
| 6061 | 0.40-0.8 | 0.7 | 0.15-0.40 | 0.15 | 0.8-1.2 | 0.04-0.35 | 0.25 | 0.15 | 0.05 | 0.15 | Rem. |

Table 2 lists the hardness of suitable alloys.

TABLE 2

| Alloy | Temper | Tensile Strength (MPa) | Hardness Brinell HB | Hardness Vickers HV |
|---|---|---|---|---|
| AA1050A | H2 | 100 | 30 | 30 |
| | H4 | 115 | 35 | 36 |
| | H6 | 130 | 39 | |
| | H8 | 150 | 43 | 44 |
| | H9 | 180 | 48 | 51 |
| AA2011 | 0 | 80 | 21 | 20 |
| | T3 | 365 | 95 | 100 |
| | T4 | 350 | 90 | 95 |
| | T6 | 395 | 110 | 115 |
| | T8 | 420 | 115 | 120 |
| AA3103 | H2 | 135 | 40 | 40 |
| | H4 | 155 | 45 | 46 |
| | H6 | 175 | 50 | 50 |
| | H8 | 200 | 55 | 55 |
| | H9 | 240 | 65 | 70 |
| AA5083 | 0 | 105 | 29 | 29 |
| | H2 | 330 | 90 | 95 |
| | H4 | 360 | 100 | 105 |
| | H6 | 380 | 105 | 110 |
| | H8 | 400 | 110 | 115 |
| | H9 | 420 | 115 | 120 |
| AA5251 | 0 | 300 | 70 | 75 |
| | H2 | 210 | 60 | 65 |
| | H4 | 230 | 65 | 70 |
| | H6 | 255 | 70 | 75 |
| | H8 | 280 | 80 | 80 |
| | H9 | 310 | 90 | 90 |
| AA5754 | 0 | 180 | 45 | 46 |
| | H2 | 245 | 70 | 75 |
| | H4 | 270 | 75 | 80 |
| | H6 | 290 | 80 | 85 |
| | H8 | 315 | 90 | 90 |
| | H9 | 340 | 95 | 100 |
| | 0 | 215 | 55 | 55 |
| AA6063 | 0 | 100 | 25 | 85 |
| | T1 | 150 | 45 | 45 |
| | T4 | 160 | 50 | 50 |
| | T5 | 215 | 60 | 65 |
| | T6 | 245 | 75 | 80 |
| | T8 | 260 | 80 | 85 |

TABLE 2-continued

| Alloy | Temper | Tensile Strength (MPa) | Hardness Brinell HB | Hardness Vickers HV |
|---|---|---|---|---|
| AA6082 | 0 | 130 | 35 | 35 |
|  | T1 | 260 | 70 | 75 |
|  | T4 | 260 | 70 | 75 |
|  | T5 | 325 | 90 | 95 |
|  | T6 | 340 | 95 | 100 |
| AA6262 | T6 | 290 |  |  |
|  | T9 | 360 |  |  |
| AA7075 | 0 | 225 | 60 | 65 |
|  | T6 | 570 | 150 | 160 |
|  | T7 | 505 | 140 | 150 |

Preferred materials for the shell are weldable aluminum alloys having a Knoop hardness of at least 50, and more preferably a Knoop hardness within the range of 70-140.

The most preferred aluminum alloys for the shell include Aluminum A356.0-T6 (Rockwell B Hardness=49; Knoop Hardness=103), Aluminum A356.0-F (Knoop Hardness=78), Aluminum A357.0-F, Aluminum A357.0-T6 (Rockwell B Hardness=56; Knoop Hardness=114), and Aluminum 6061-T6 (Rockwell B Hardness=60; Knoop Hardness=120).

The radial thickness of fins 23 and horizontal supports 24, 25, 26, 27 should be sufficient to exceed the reach of a typical battery-operated angle grinder disk. Such disks can typically cut to a depth of about 35 mm so fins 23 should extend at least 35 mm from the outer surface of the hardened lock assembly 1. Preferably, fins 23 extend radially away from the outer surface of lock assembly 1 by a distance within the range of 36-100 mm, more preferably a distance within the range of 40-75 mm.

Similarly, fins 43 should be spaced around the lock so that a grinder blade must engage at least two, and preferably three of the fins as it cuts toward the lock assembly. The additional material hastens the rate of clogging of the coarse blade grit as well as the drain on the battery as the user presses harder to continue to see the same rate of cut but with an even more dull disk.

Surprisingly, the presence of horizontal supports introduces an extra level of difficulty when a thief attempts to defeat the lock of the present invention. Compared to a planar cut test through just a set of only vertical fins, the connection of the horizontal members with all of the fins requires the attacker to make twice the number of cuts to remove any singular fin. Additionally, the distribution of the fins around the surface (e.g., a radial fin-to-fin distribution angle within the range of 30-40°, preferably an angle of about 36° fin-to-fin distribution) limits the advantage of removing any singular fin when attacking with an angle grinder. Instead, the attacker must remove at least two neighboring fins to gain any sort of geometric advantage with an angle grinder disc. As noted above, this accelerates the clogging actions on the disk and increases the battery drain of the device.

The external fins are preferably straight although it is within the scope of the invention to provide fins that are non-straight, e.g., exhibiting a wavy pattern or which are not at right angles relative to an adjacent fin.

It is understood however that the description above is intended to describe preferred embodiments and is not intended to limit the scope of the appended claims.

The invention claimed is:

1. A trailer hitch lock that comprises:
   (a) a lock assembly that includes a locking mechanism operably movable vertically from a first unlocked position into a second locked position, wherein said locking assembly is disposed in a vertically-oriented, central chamber located within (b) a shell comprising a plurality of fins that radially extend from said locking assembly by a distance within a range of 36-100 mm, wherein the fins are of sufficient number and are spaced around said lock assembly so that a grinder blade must engage at least two fins as said grinder blade grinds through the fins toward said lock assembly, wherein the shell surrounds said lock assembly and exhibits a slot that is shaped to receive and engage a trailer hitch receiver coupling.

2. A lock according to claim 1 further comprising one or more seals around movable parts to provide resistance to moisture infiltration into said lock.

3. A lock according to claim 1 wherein said lock assembly further comprises a freely rotating ring around a key opening into a locking mechanism, said ring having a central hole that tapers at an angle within a range of 75°-100° towards an opening that exposes said key opening.

4. A lock according to claim 1 wherein the shell is made from aluminum alloys having a Knoop hardness of at least 50.

5. A lock according to claim 4 wherein the shell is made from aluminum alloys having a Knoop hardness within the range of 70-140.

6. A lock according to claim 4 wherein the plurality of fins have a radial length from said locking assembly that is sufficient to exceed a 35 mm grinding depth of a typical battery-operated grinder disk.

7. A lock according to claim 1 wherein said lock assembly in secured in said shell with a locking ring having radially extending, diametrically opposing, threaded, openings that receive set screws from within said locking ring and extending radially outwardly in said openings into a recess of said shell.

8. A lock according to claim 1 wherein said shell has a plurality of fins that radially extend from said locking assembly by a distance within the range of 40-75 mm.

9. A lock according to claim 1 wherein the fins are distributed around the shell surface at a radial fin-to-fin distribution angle that is within a range of 30-40°.

10. A lock according to claim 9 wherein the fins are distributed around the shell surface at a radial fin-to-fin distribution angle of about 36°.

11. A lock according to claim 1 wherein said slot receives a trailer hitch having a radial flange.

12. A lock according to claim 1 wherein said shell is a unitary part that has been cast in place around said lock assembly.

13. A lock according to claim 1 wherein said shell is made of a hardened steel core coupler sandwiched between a top shell piece and a bottom shell piece that are joined together around the core coupler.

14. A lock according to claim 1 wherein the lock assembly further comprises a locking ring that is secured in position in said shell with a pair of opposing set screws that can only be accessed when the lock assembly is in an unlocked position and removed, wherein the set screws extend into a groove in said shell.

15. A lock according to claim 1 wherein said shell is made from hardened steel.

16. A lock according to claim 15 wherein the plurality of fins has a radial length from said locking assembly that is sufficient to exceed a 35 mm grinding depth of a typical battery-operated grinder disk.

17. A lock according to claim 1 having 7-15 vertical ribs.

18. A lock according to claim 17 wherein said ribs are made of a material that is relatively softer than metal in the lock assembly.

19. A lock according to claim 1 wherein the plurality of fins have a radial length from said locking assembly that is sufficient to exceed a 35 mm grinding depth of a typical battery-operated grinder disk.

20. A lock according to claim 19 wherein said plurality of fins comprise vertically-oriented fins and horizontally-oriented support members.

21. A lock according to claim 1 wherein said lock assembly is made of stainless steel.

22. A trailer hitch lock that comprises:
 (a) a lock assembly that includes a locking mechanism operably movable vertically from a first unlocked position into a second locked position, wherein said locking assembly is disposed in a vertically-oriented, central chamber located within (b) a shell comprising a plurality of vertically-oriented fins and horizontally-oriented fins that radially extend from said locking assembly by a distance within a range of 36-100 mm,
 wherein the shell surrounds said lock assembly and exhibits a slot that is shaped to receive and engage a trailer hitch receiver coupling, and
 wherein the lock assembly further comprises a locking ring that is secured in position in said shell with a pair of opposing set screws that can only be accessed when the lock assembly is in an unlocked position and removed, wherein the set screws extend into a groove in said shell.

23. A trailer hitch lock that comprises:
 (a) a lock assembly that includes a locking mechanism operably movable vertically from a first unlocked position into a second locked position, wherein said locking assembly is disposed in a vertically-oriented, central chamber located within (b) a shell comprising a plurality of vertically-oriented fins and horizontally-oriented fins that radially extend from said locking assembly by a distance within a range of 36-100 mm,
 wherein the shell surrounds said lock assembly and exhibits a slot that is shaped to receive and engage a trailer hitch receiver coupling, and
 wherein said lock assembly in secured in said shell with a locking ring having radially extending, diametrically opposing, threaded, openings that receive set screws from within said locking ring and extending radially outwardly in said openings into a recess of said shell.

* * * * *